United States Patent
Won et al.

(10) Patent No.: US 7,138,777 B2
(45) Date of Patent: Nov. 21, 2006

(54) SENSORLESS MOTOR DRIVE APPARATUS AND METHOD FOR PROTECTING AND CONTROLLING THE SAME

(75) Inventors: June Hee Won, Seoul (KR); Jae Yoon Oh, Kwangmyung-si (KR); Gil Su Lee, Seoul (KR); Dal Ho Cheong, Seoul (KR); Kyung Hoon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/037,015

(22) Filed: Jan. 19, 2005

(65) Prior Publication Data
US 2006/0033457 A1 Feb. 16, 2006

(30) Foreign Application Priority Data
Aug. 12, 2004 (KR) .................. 10-2004-0063580

(51) Int. Cl.
*H02P 7/06* (2006.01)
(52) U.S. Cl. .................. 318/254; 318/721; 318/700; 318/714; 318/138; 318/439
(58) Field of Classification Search ............... 318/721, 318/700, 714, 254, 138, 439
See application file for complete search history.

(56) References Cited

U.S. PATENT DOCUMENTS

| | | | | |
|---|---|---|---|---|
| 5,565,752 A | * | 10/1996 | Jansen et al. | 318/807 |
| 5,585,709 A | * | 12/1996 | Jansen et al. | 318/807 |
| 6,137,258 A | * | 10/2000 | Jansen | 318/802 |
| 6,163,127 A | * | 12/2000 | Patel et al. | 318/700 |
| 6,339,308 B1 | * | 1/2002 | Shinnaka | 318/701 |
| 6,462,492 B1 | * | 10/2002 | Sakamoto et al. | 318/254 |
| 6,628,099 B1 | * | 9/2003 | Iwaji et al. | 318/700 |

* cited by examiner

*Primary Examiner*—Rita Leykin
(74) *Attorney, Agent, or Firm*—Birch, Stewart, Kolasch & Birch, LLP

(57) ABSTRACT

A sensorless motor drive apparatus and a method for protecting and controlling the same. The sensorless motor drive apparatus includes a unit for determining the presence or absence of a position estimation error of a rotor contained in a motor using a current value applied to the motor and a position estimation angle of the rotor. Therefore, the sensorless motor drive apparatus determines the presence or absence of the position estimation error of the rotor without using a sensor, so that it reduces production costs, prevents the motor from generating a faulty operation, and prevents a compressor including the motor from being damaged.

14 Claims, 5 Drawing Sheets

SENSORLESS MOTOR DRIVE APPARATUS AND METHOD FOR PROTECTING AND CONTROLLING THE SAME

BACKGROUND OF THE INVENTION

1. Field of the Invention

The present invention relates to a sensorless motor drive apparatus and a method for protecting and controlling the same, and more particularly to a sensorless motor drive apparatus including a position estimation error detector so that it can determine whether an unexpected error occurs in estimating a position of a rotor of a motor with the sensorless method using a software method, and a method for protecting and controlling the sensorless motor drive apparatus.

2. Description of the Related Art

A conventional sensorless motor drive apparatus will hereinafter be described with reference to FIG. 1.

Figure 1:
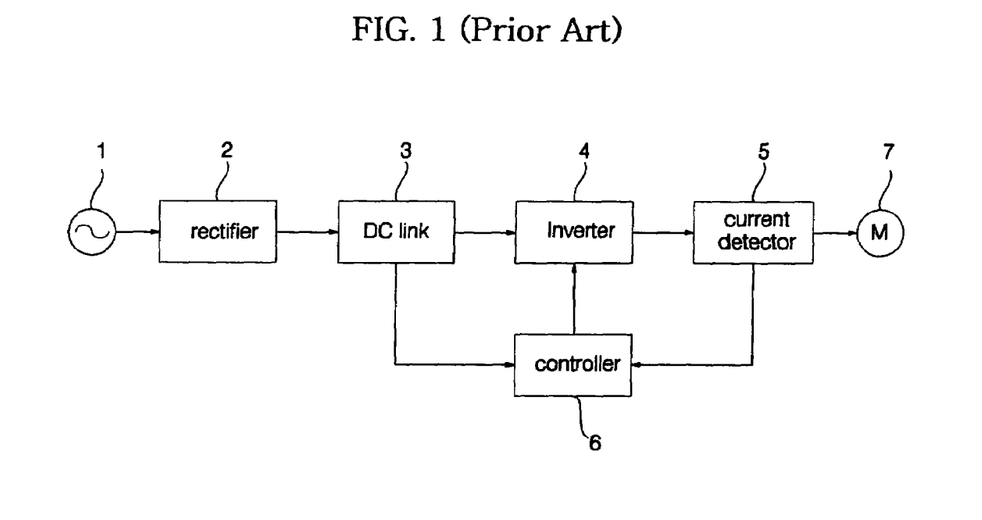
FIG. 1 is a block diagram illustrating a conventional sensorless motor drive apparatus.

FIG. 1 is a block diagram illustrating the conventional sensorless motor drive apparatus. Referring to FIG. 1, the conventional sensorless motor drive apparatus includes a rectifier 2 for rectifying an AC voltage generated from an AC power source 1 to a DC voltage; a DC link 3 including a plurality of capacitors, for smoothing the DC voltage, and outputting the smoothed DC voltage to an external part; an inverter 4 for receiving the rectified voltage, and converting the received rectified voltage into a three-phase AC voltage; a current detector 5 for detecting a current transmitted from the inverter 4 from a motor 7; and a controller 6 for estimating a rotation speed and a rotor position of the motor 7 on the basis of voltage and current signals applied to the motor 7, and transmitting a control signal to the inverter 4 to control the motor 7.

The above-mentioned sensorless motor drive apparatus mounts the motor to a specific structure such as a compressor incapable of mounting a sensor therein, and detects the rotation speed and the rotor position of the motor, etc.

If the sensor is mounted to the motor drive apapratus, there arise a variety of problems, for example, the increase of production costs and the reliability deterioration caused by a damaged sensor, etc. The sensorless motor drive apparatus is able to improve the above-mentioned problems.

Operations of the above-mentioned conventional sensorless motor drive apparatus will hereinafter be described with reference to FIG. 1.

The AC voltage generated from the AC power source 1 is applied to the sensorless motor drive apparatus to operate the motor 7. The rectifier 2 rectifies the AC voltage to a DC voltage, and transmits the DC voltage to the DC link 3.

The DC link 3 smoothes the DC voltage received from the rectifier 2, outputs the smoothed DC voltage to an external part. The inverter 4 receives the smoothed DC voltage from the DC link 3, converts the received DC voltage into a three-phase voltage, and outputs the three-phase voltage to the motor 7, so that it properly controls the motor 7.

The sensorless motor drive apparatus further includes the current detector 5, so that the current detector 5 detects the magnitude of a current applied from the inverter 4 to the motor 7. In order to normally operate the motor 7, the controller 6 estimates a rotation speed and a rotor position of the motor 7 using the voltage measured by the DC link 3 and the magnitude of the current detected by the current detector 5, and transmits a control signal capable of controlling the motor 7 in response to the estimated rotation speed and the estimated rotor position of the motor 7 to the inverter 4.

A sensorless control method for the motor 7 is of importance to a guarantee of stability. Typically, if an overvoltage occurs in the DC link 3 contained in the sensorless motor drive apparatus, or if the overcurrent is applied to the motor 7, the motor 7 may be erroneously operated or be damaged, and a compressor to which the motor 7 is mounted may also be damaged, so that the sensorless motor drive apparatus further includes a protective device for guaranteeing the stability to prevent the above-mentioned problems from being generated, for example, an overvoltage detector (not shown), a low-voltage detector (not shown), or an overcurrent detector (not shown).

Each of the overvoltage detector and the low-voltage detector acting as the above-mentioned protective devices receives a voltage signal applied to the DC link 3, and outputs an error signal to the controller 6 when an unexpected error occurs in the received voltage signal. The overcurrent detector receives a current signal from the current detector 5, and outputs an error signal to the controller 6 when an unexpected error occurs in the received current signal.

The controller 6 having received the error signal stops generation of a Pulse Width Modulation (PWM) signal transmitted to the inverter 4 capable of controlling the motor 7, so that the inverter 4 stops operations of the motor 7.

However, in the conventional sensorless motor drive apparatus capable of implementing a sensorless control process by estimating the rotation speed and the rotor position of the motor, if an unexpected error occurs in the sensorless control process, the conventional sensorless motor drive apparatus has no device for detecting the error and coping with the detected error, with the exception of the above-mentioned protective devices, so that there is difficulty in guaranteeing the stability of the sensorless motor drive apparatus.

In more detail, an unexpected error may occur in estimating a rotor position of the motor, and this error is called a position estimation error. However, the position estimation error is not detected by the overvoltage detector, the low-voltage detector, or the overcurrent detector.

Therefore, provided that the motor is continuously operated on the condition that the position estimation error is excessively generated, a normal sensorless control process is not performed, so that the motor drive apparatus and the compressor including the motor are damaged.

SUMMARY OF THE INVENTION

Therefore, it is an object of the present invention to provide a sensorless motor drive apparatus for determining the presence or absence of a position estimation error of a rotor using a software method instead of using a sensor so that it prevents a motor from generating a faulty operation or prevents a compressor including the motor from being damaged, and a method for protecting and controlling the sensorless motor drive apparatus.

In accordance with one aspect of the present invention, the above and other objects can be accomplished by the provision of a sensorless motor drive apparatus, comprising: a rectifier for rectifying an AC (Alternating Current) voltage generated from an AC power source to a DC (Direct Current) voltage; an inverter for receiving the DC voltage from the rectifier, and converting the received DC voltage into a three-phase AC voltage; a current detector for detecting a value of a current transmitted from the inverter to a motor; a controller for estimating a rotation speed and a rotor position of the motor using voltage and current signals applied to the motor, and transmitting a control signal to the inverter to control the motor; and a position estimation error detector for determining the presence or absence of a position estimation error of the motor using the current value detected by the current detector and a rotor position estimation angle estimated by the controller.

Preferably, the position estimation error detector includes: a three-phase/stationary coordinate system converter for converting three-phase current values (Iu,Iv, and Iw) detected by the current detector into stationary coordinate system current values ($i_\alpha$ and $i_\beta$); a stationary/synchronous coordinate system converter for converting the stationary coordinate system current values ($i_\alpha$ and $i_\beta$) using data (cos θ and sin θ) associated with the position estimation angle into synchronous coordinate system current values ($i_d$ and $i_q$); a current calculator for calculating a predetermined value C using a predetermined equation including the stationary coordinate system current values ($i_\alpha$ and $i_\beta$) and the synchronous coordinate system current values ($i_d$ and $i_q$) and generating the calculated value C; and a position estimation error determination unit for comparing the calculated value C with a reference value A, and determining the presence or absence of the position estimation error of the motor according to the result of the comparison.

Preferably, the current calculator receives the stationary coordinate system current values from the three-phase/stationary coordinate system converter, receives the synchronous coordinate system current values from the stationary/synchronous coordinate system converter, and outputs a predetermined value C defined by a predetermined equation to the position estimation error determination unit. In this case, the current calculator may satisfy the predetermined equation denoted by $C=\sqrt{i_\alpha^2+i_\beta^2}-\sqrt{i_d^2+i_q^2}$ when generating the calculated value C.

Preferably, the position estimation error determination unit compares the calculated value C received from the current calculator with the reference value A, and determines whether a difference between the calculated value C and the reference value A is equal to or higher than a predetermined value α. Preferably, the position estimation error determination unit outputs an error signal to the controller when the difference between the calculated value C and the reference value A is equal to or higher than the predetermined value α.

Preferably, the controller receives the error signal from the position estimation error determination unit, prevents a Pulse Width Modulation (PWM) signal from being transmitted to the inverter, and stops operations of the motor.

In accordance with another aspect of the present invention, there is provided a method for protecting and controlling a sensorless motor drive apparatus, comprising: detecting three-phase current values applied to a motor, and converting the detected three-phase current values into stationary coordinate system current values $i_\alpha$ and $i_\beta$; converting the stationary coordinate system current values $i_\alpha$ and $i_\beta$ using data(sin θ, cos θ) associated with a position estimation angle of the motor into synchronous coordinate system current values $i_d$ and $i_q$; calculating a predetermined value C according to a predetermined equation including the stationary coordinate system current values $i_\alpha$ and $i_\beta$ and the synchronous coordinate system current values $i_d$ and $i_q$, and generating the calculated value C; and comparing the calculated value C with a predetermined reference value A, and generating an error signal if it is determined that a difference between the calculated value C and the reference value A is equal to or higher than a predetermined value α.

Preferably, the calculating calculates the predetermined value C using the stationary coordinate system current values $i_\alpha$ and $i_\beta$ and the synchronous coordinate system current values $i_d$ and $i_q$, and generates the calculated value C. In this case, the calculated value C is calculated by the predetermined equation denoted by $C=\sqrt{i_\alpha^2+i_\beta^2}-\sqrt{i_d^2+i_q^2}$.

Preferably, the comparing and generating outputs the error signal to a controller controlling operations of the motor when the difference between the calculated value C and the reference value A is equal to or higher than the predetermined value α. Upon receipt of the error signal, the controller prevents a PWM signal from being generated, and stops operations of the motor.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 2:
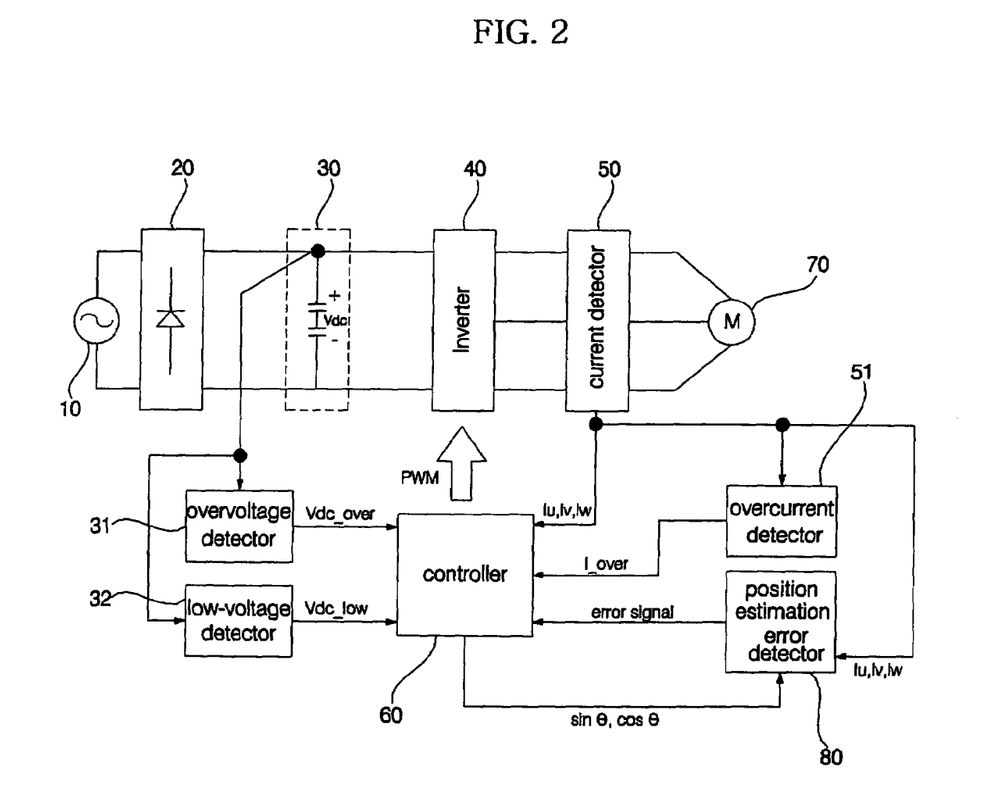
FIG. 2 is a block diagram illustrating a sensorless motor drive apparatus according to the present invention.

FIG. 2 is a block diagram illustrating a sensorless motor drive apparatus according to the present invention. Compared with the conventional sensorless motor drive apparatus of FIG. 1, the sensorless motor drive apparatus includes FIG. 2 further includes a position estimation error detector. Referring to FIG. 2, the sensorless motor drive apparatus includes a rectifier 20 for rectifying an AC voltage generated from an AC power source 10 to a DC voltage; a DC link 30 including a plurality of capacitors, for smoothing the DC voltage received from the rectifier 20; an inverter 40 for receiving the DC voltage from the DC link 30, and properly controlling the motor 70; a current detector 50 for detecting the magnitude of a current transmitted from the inverter 40 to the motor 70; and a controller 60 for estimating a rotation speed and a rotor position of the motor 70 using voltage and current signals applied to the motor 70, and transmitting a control signal to the inverter 40 so that it controls the motor 70 on the basis of the estimated rotation speed and the estimated rotor position of the motor 70. The above-mentioned components of the sensorless motor drive apparatus are the same as those of the conventional sensorless motor drive apparatus.

The sensorless motor drive apparatus according to the present invention includes an overvoltage detector 31, a low-voltage detector 32, and an overcurrent detector 51 so that it can guarantee stability. Particularly, the sensorless motor drive apparatus further includes a position estimation error detector 80 to determine the presence or the position estimation error detector associated with the rotor of the motor 70 more.

Operations of the above-mentioned sensorless motor drive will hereinafter be described with reference to FIG. 2.

The AC voltage generated from the AC power source 10 is sequentially applied to the rectifier 20 and the DC link 30, so that it is converted into a smoothed DC voltage. The smoothed DC voltage is applied to the inverter 40.

The inverter 40 receives the smoothed DC voltage from the DC link 30, and directly provides the motor 70 with a supply voltage so as to rotate the motor 70. Typically, the inverter 40 converts a DC voltage into a three-phase AC voltage, and outputs the three-phase AC voltage to the motor 70, so that the rotation of the motor 70 is controlled by the three-phase AC voltage generated from the inverter 40.

Provided that currents of individual phases (i.e., three-phase currents) of the three-phase AC voltage transmitted from the inverter 40 to the motor 70 are determined to be Iu,Iv, and Iw, respectively, the magnitudes of the three-phase currents are detected by the current detector 50, and signals indicative of the detected current values are transmitted to the controller 60, the overcurrent detector 51, and the position estimation error detector 80.

A voltage detector (not shown) including a plurality of resistors to detect a voltage applied to the DC link 30 is connected in parallel to the DC link 30. The DC link 30 transmits the voltage value detected by the voltage detector to the overvoltage detector 31 and the low-voltage detector 32.

If the above-mentioned means for detecting an over-power state (i.e., the overcurrent detector 51, the overvoltage detector 31, and the low-voltage detector 32) determine the occurrence of an error in the received voltage and current signals, the overcurrent detector 51 transmits an error signal I_over to the controller 60, the overvoltage detector 31 transmits an error signal Vdc_over to the controller 60, and the low-voltage detector 32 transmits an error signal Vdc_low to the controller 60.

The controller 60 estimates the rotor position and the rotation speed of the motor 70 using the voltage and current signals applied to the motor 70. Particularly, the controller 60 estimates a position angle $\theta$ of the rotor, calculates the values of cos $\theta$ and sin $\theta$ on the basis of the determined position angle $\theta$, and transmits a signal indicative of the calculated values of cos $\theta$ and sin $\theta$ to the position estimation error detector 80.

The position estimation error detector 80 receives position angle information (cos $\theta$ and sin $\theta$) from the controller 60, receives three-phase current values (Iu,Iv, and Iw) applied to the motor 70, and determines whether an unexpected error occurs in estimating a rotor position of the motor 70 on the basis of the three-phase current values and the values of cos $\theta$ and sin $\theta$. Operations of the above-mentioned position estimation error detector 80 will hereinafter be described with reference to FIGS. 3a, 3b, 4, 5, 6, 7, and 8.

Figure 3A:
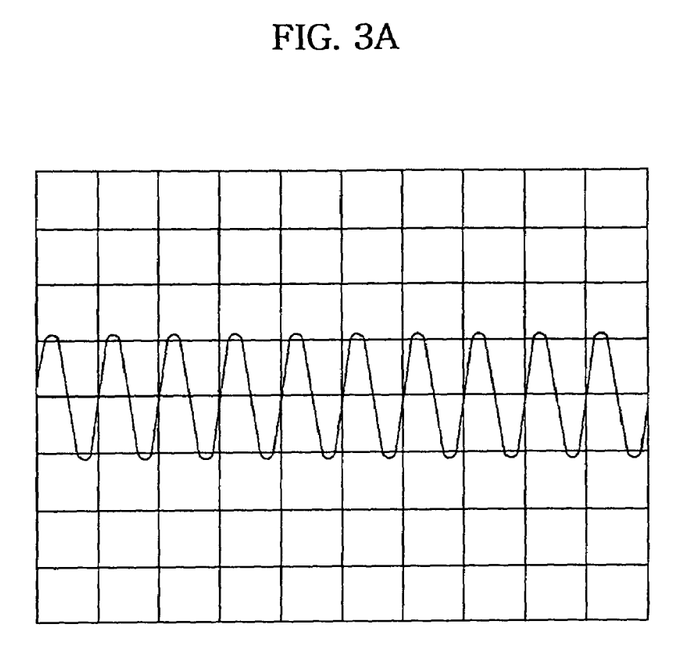
FIGS. 3a~3b are waveform diagrams each illustrating a current signal applied to a motor.
Figure 3B:
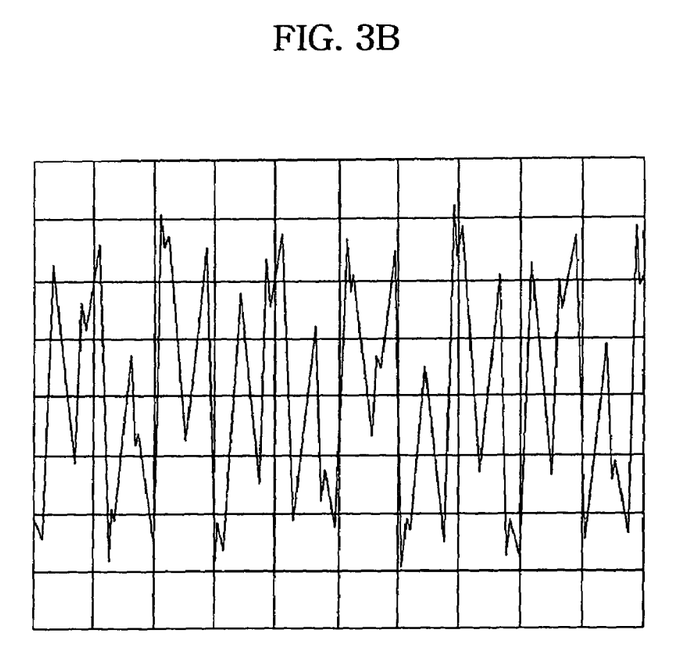

FIGS. 3a~3b are waveform diagrams each illustrating a current signal applied to the motor 70. In more detail, FIG. 3a is a waveform diagram illustrating a current signal generated in a normal sensorless control process, and FIG. 3b is a waveform diagram illustrating a current signal generated when a faulty operation occurs in the sensorless control process and an excessive error occurs in estimating the rotor position of the motor 70.

Figure 4:
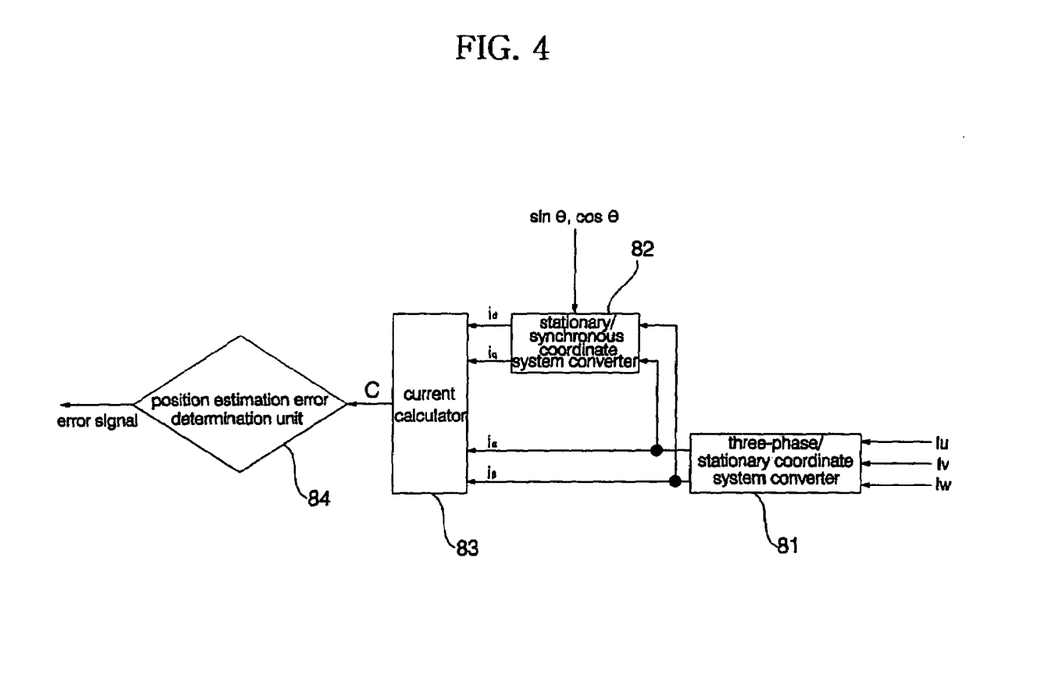
FIG. 4 is a block diagram illustrating a position estimation error detector of a rotor contained in the sensorless motor drive apparatus according to the present invention.

FIG. 4 is a block diagram illustrating the position estimation error detector 80 contained in the sensorless motor drive apparatus according to the present invention.

Referring to FIG. 4, the position estimation error detector 80 includes a three-phase/stationary coordinate system converter 81 for receiving the three-phase current values (Iu,Iv, and Iw) applied to the motor 70, and converting the received three-phase current values (Iu,Iv, and Iw) into stationary $\alpha$-axis and $\beta$-axis values ($i_\alpha$ and $i_\beta$) associated with a stationary coordinate system; and a stationary/synchronous coordinate system converter 82 for receiving the stationary coordinate system current values ($i_\alpha$ and $i_\beta$) from the three-phase/stationary coordinate system converter 81, receiving the values of cos $\theta$ and sin $\theta$ from the controller 60, and converting the received stationary coordinate system current values ($i_\alpha$ and $i_\beta$) into synchronous d-axis and q-axis values ($i_d$ and $i_q$) associated with a synchronous coordinate system.

The position estimation error detector 80 includes a current calculator 83 for calculating a predetermined value C using a predetermined equation including the stationary coordinate system current values ($i_\alpha$ and $i_\beta$) and the synchronous coordinate system current values ($i_d$ and $i_q$), and generating the calculated value C. The position estimation error detector 80 further includes a position estimation error determination unit 84. The position estimation error determination unit 84 compares the output value C of the current calculator 83 with a reference value A, and determines the occurrence of a position estimation error when a difference between the output value C and the reference value A is equal to or higher than a predetermined value $\alpha$.

Detailed operations of the three-phase/stationary coordinate system converter 81, the stationary/synchronous coordinate system converter 82, the current calculator 83, and the position estimation error determination unit 84 are shown in FIGS. 5~8.

Figure 5:
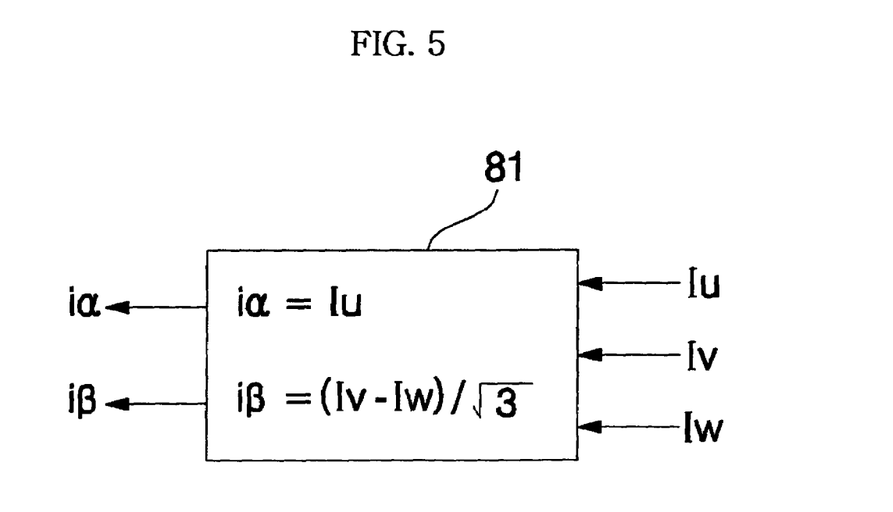
FIG. 5 is a block diagram illustrating the relationship between Input and Output (I/O) signals for converting a current value in response to a stationary coordinate system into another value according to the present invention.
Figure 6:
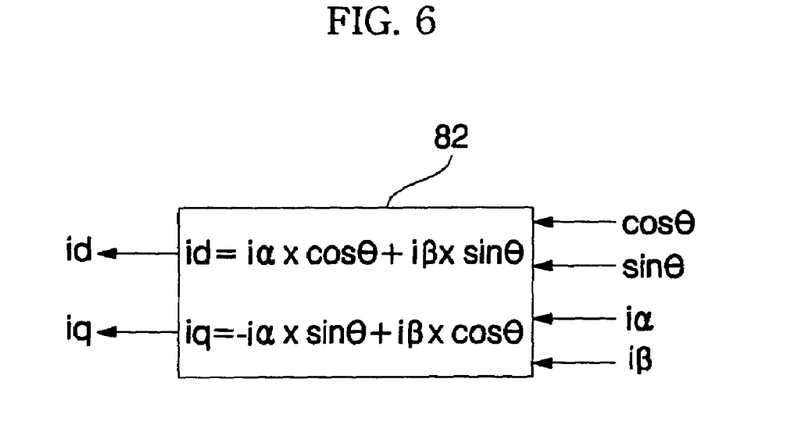
FIG. 6 is a block diagram illustrating the relationship between I/O signals for converting a current value in response to a synchronous coordinate system into another value according to the present invention.
Figure 7:
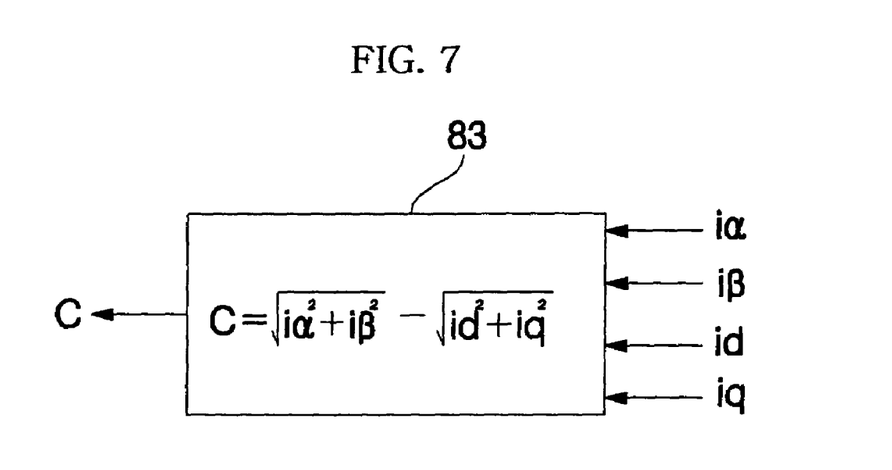
FIG. 7 is a block diagram illustrating operations of a current calculator for use in the sensorless motor drive apparatus according to the present invention.
Figure 8:
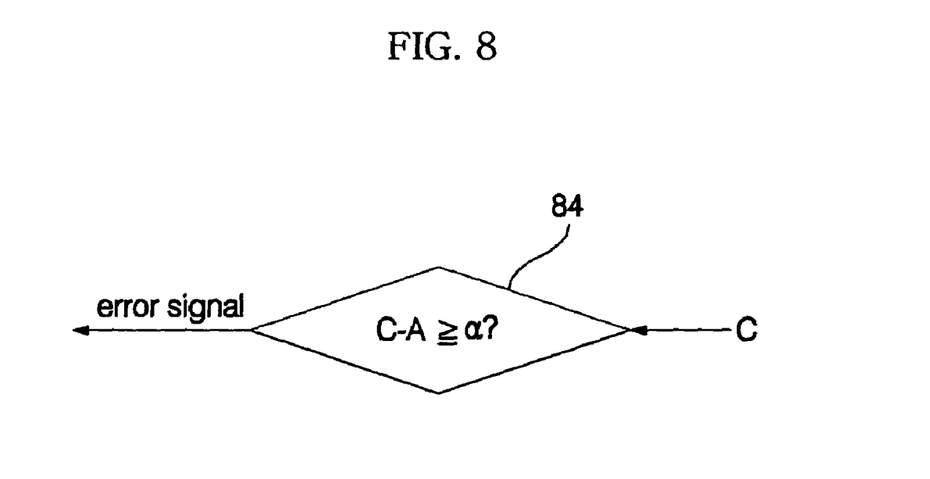
FIG. 8 is a block diagram illustrating operations of a position estimation error determination unit for use in the sensorless motor drive apparatus according to the present invention.

FIG. 5 is a block diagram illustrating the relationship converting the three-phase current values applied to the motor into stationary coordinate system $\alpha$-axis and $\beta$-axis values according to the present invention. FIG. 6 is a block diagram illustrating the relationship between I/O signals for converting a current value in response to a synchronous coordinate system into another value. FIG. 7 is a block diagram illustrating operations of the current calculator 83 according to the present invention. FIG. 8 is a block diagram illustrating operations of the position estimation error determination unit 84 according to the present invention.

Referring to FIG. 5, the three-phase/stationary coordinate system converter 81 receives three-phase current signals Iu,Iv, and Iw, and outputs stationary coordinate system current values $i_\alpha$ and $i_\beta$ (where $i_\alpha$=Iu, and $i_\beta$=(Iv−Iw)/$\sqrt{3}$) to an external part. Referring to FIG. 6, the stationary/synchronous coordinate system converter 81 receives the stationary coordinate system current values ($i_\alpha$ and $i_\beta$) and position angle information ($\cos\theta$ and $\sin\theta$), and outputs synchronous coordinate system current values $i_d$ and $i_q$ (where $i_d = i_\alpha^* \cos\theta + i_\beta^* \sin\theta$ and $i_q = -i_\alpha^* \sin\theta + i_\beta^* \cos\theta$) to the external part.

The above-mentioned values $i_\alpha$, $i_\beta$, $i_d$, and $i_q$ satisfy a predetermined equation denoted by $\sqrt{i_\alpha^2 + i_\beta^2} = \sqrt{i_d^2 + i_q^2} = \text{Ipeak}$ (where Ipeak=peak values of individual phase currents contained in the three-phase current).

Referring to FIG. 7, the current calculator 83 receives the stationary coordinate system current values ($i_\alpha$, and $i_\beta$) and the synchronous coordinate system current values ($i_d$ and $i_q$), calculates a predetermined value C using a predetermined equation denoted by $\sqrt{i_\alpha^2 + i_\beta^2} - \sqrt{i_d^2 + i_q^2}$, and outputs the calculated value C to an external part. In the case where a position estimation process of the rotor of the sensorless motor is normally performed, this case satisfies the above-mentioned equation $\sqrt{i_\alpha^2 + i_\beta^2} = \sqrt{i_d^2 + i_q^2}$, so that the calculated value C is equal to "0".

Referring to FIG. 8, the position estimation error determination unit 84 receives the calculated value C from the current calculator 83, compares the receives value C with a predetermined reference value A, determines the occurrence of a position estimation error when a difference between the calculated value C and the reference value A is equal to or higher than a predetermined value $\alpha$ (where $\alpha \leq C-A$), and transmits a predetermined error signal to the controller 60.

In more detail, if the occurrence of the error is determined in the case of detecting the position of the rotor, this means that there is an error in the position angle $\theta$ of the rotor, so that the erroneous position angle is applied to the above-mentioned equations $i_d = i_\alpha^* \cos\theta + i_\beta^* \sin\theta$ and $i_q = -i_\alpha^* \sin\theta + i_\beta^* \cos\theta$, resulting in the occurrence of an error in the values of $i_d$ and $i_q$. As a result, the calculated value C is equal to "0" in a normal operation case, but the calculated C is not equal to "0" in an abnormal operation case where the error occurs in detecting the rotor position of the motor.

In order to determine the occurrence of an error in detecting the rotor position of the motor when the rotor position detection error value higher than a predetermined value is generated, the position estimation error determination unit 84 compares the calculated value C with the reference value A, and transmits an error signal to the controller 60 only when a difference between the calculated value C and the reference value A is equal to or higher than a predetermined value $\alpha$.

As stated above, if the controller 60 receives the error signal from the position estimation error detector 80, it prevents a PWM signal from being transmitted to the inverter 40, and stops operations of the motor so that it protects the motor drive apparatus and a compressor including the motor therein, etc.

Figure 9:
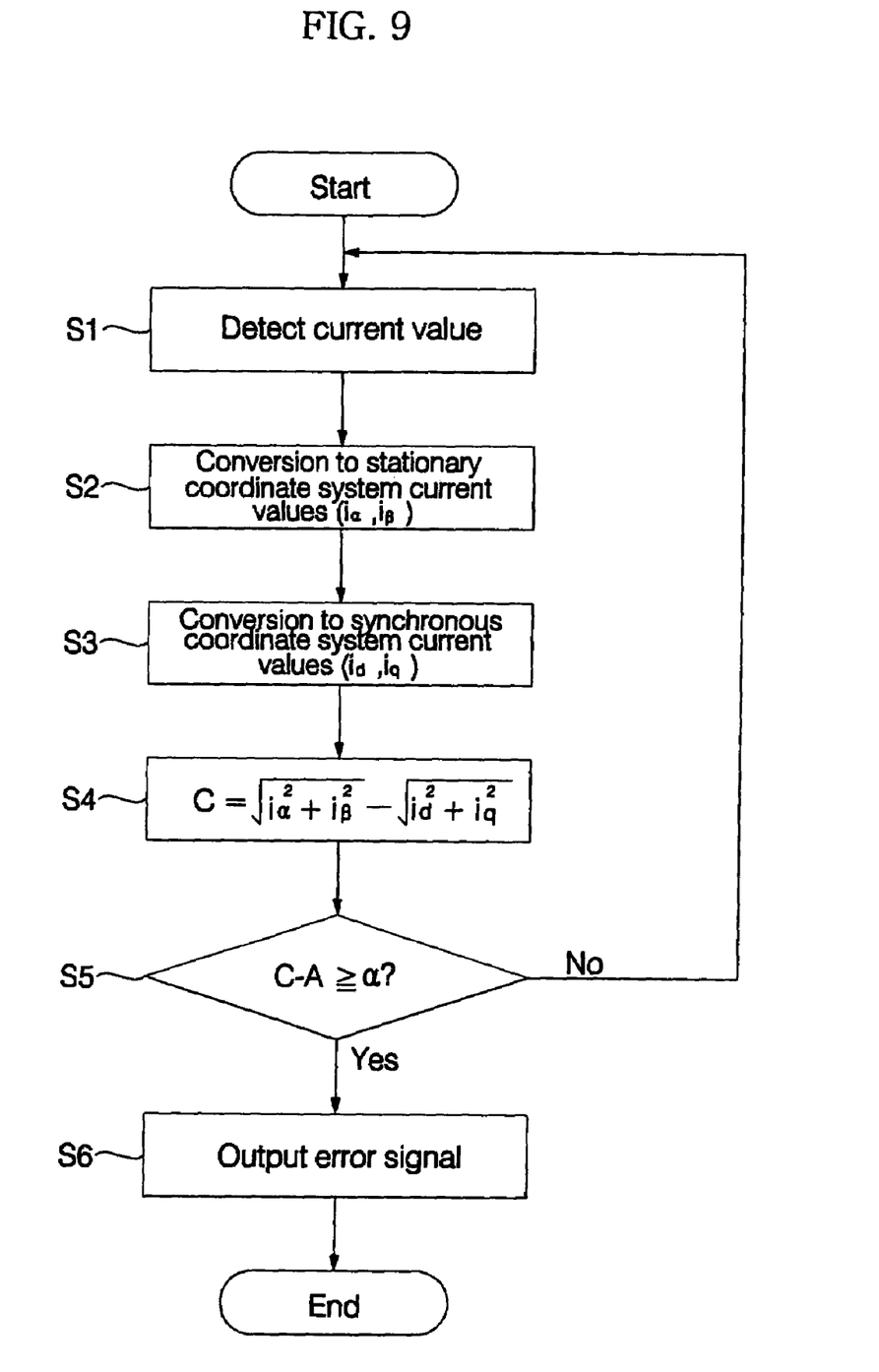
FIG. 9 is a flow chart illustrating a method for detecting the presence or absence of a position estimation error in a method for protecting and controlling the sensorless motor drive apparatus according to the present invention.

FIG. 9 is a flow chart illustrating a method for detecting the presence or absence of a position estimation error in a method for protecting and controlling the sensorless motor drive apparatus according to the present invention.

The method for protecting and controlling the above-mentioned sensorless motor drive apparatus will hereinafter be described with reference to FIG. 9.

The sensorless motor drive apparatus detects three-phase current values (Iu, Iv, and Iw) applied to the motor at step S1, and converts the detected three-phase current values (Iu, Iv, and Iw) into stationary coordinate system current values $i_\alpha$ and $i_\beta$ at step S2.

Thereafter, the sensorless motor drive apparatus calculates synchronous coordinate system current values $i_d$ and $i_q$ using the stationary coordinate system current values $i_\alpha$ and $i_\beta$ and the position estimation angle $\theta$ of the motor at step S3. The sensorless motor drive apparatus calculates a predetermined value C according to a predetermined equation including the stationary coordinate system current values $i_\alpha$ and $i_\beta$ and the synchronous coordinate system current values $i_d$ and $i_q$, and generates the calculated value C at step S4.

If the calculated value C is generated at step S4, the sensorless motor drive apparatus compares the calculated value C with the reference value A, and determines whether a difference between the calculated value C and the reference value A is equal to or higher than a predetermined value $\alpha$ at step S5. If it is determined that the difference between the values C and A is equal to or higher than the predetermined value $\alpha$ at step S5, the sensorless motor drive apparatus generates an error signal at step S6 in such a way that it determines the presence or absence of a position estimation error and controls the motor according to the determined result.

As previously stated in the operations of the sensorless motor drive apparatus of the present invention, a conversion equation for converting the three-phase current value into the stationary coordinate system current value is denoted by $i_\alpha = \text{Iu}$ and $i_\beta = (\text{Iv}-\text{Iw})/\sqrt{3}$, and a conversion equation for converting the stationary coordinate system current value into the synchronous coordinate system current value is denoted by $i_d = i_\alpha^* \cos\theta + i_\beta^* \sin\theta$ and $i_q = -i_\alpha^* \sin\theta + i_\beta^* \cos\theta$.

When generating the calculated value C by calculating the stationary coordinate system current values and the synchronous coordinate system current values, the calculated value C is denoted by $C = \sqrt{i_\alpha^2 + i_\beta^2} - \sqrt{i_d^2 + i_q^2}$.

In the meantime, if it is determined that the difference between the calculated value C and the reference value A is less than the predetermined value $\alpha$ at step S5, the sensorless motor drive apparatus returns to step S1, so that it detects the three-phase current values applied to the motor and determines the presence or absence of a position estimation error on the basis of the detected three-phase current values. In this case, if it is determined that the difference between the calculated value C and the reference value A is equal to or higher than the predetermined value $\alpha$, the sensorless motor drive apparatus outputs the error signal to the controller controlling operations of the motor. Upon receipt of the error signal, the controller prevents the PWM signal from being generated so that it stops operations of the motor.

As apparent from the above description, the sensorless motor drive apparatus and the method for protecting/controlling the same according to the present invention can determine the presence or absence of the position estimation error of the rotor using a software method instead of using a sensor, so that it reduces production costs, prevents the motor from generating a faulty operation, and prevents a compressor including the motor from being damaged.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A sensorless motor drive apparatus, comprising:
   a rectifier for rectifying an AC (Alternating Current) voltage generated from an AC power source to a DC (Direct Current) voltage;

an inverter for receiving the DC voltage from the rectifier, and converting the received DC voltage into a three-phase AC voltage;

a current detector for detecting a value of a current transmitted from the inverter to a motor;

a controller for estimating a rotation speed and a rotor position of the motor using voltage and current signals applied to the motor, and transmitting a control signal to the inverter to control the motor; and a position estimation error detector for determining the presence or absence of a position estimation error of the motor using the current value detected by the current detector and the rotor position estimated by the controller, the position estimation error detector sending an error signal to the controller at the presence of the position estimation error of the motor, wherein the position estimation error detector includes a three-phase/stationary coordinate system converter for converting three-phase current values (Iu, Iv, and Iw) detected by the current detector into stationary coordinate system current values ($i_\alpha$ and $i_\beta$).

2. The apparatus as set forth in claim 1, wherein the position estimation error detector further includes a stationary/synchronous coordinate system converter for converting the stationary coordinate system current values ($i_\alpha$ and $i_\beta$) using data ($\cos\theta$ and $\sin\theta$) associated with the position estimation angle into synchronous coordinate system current values ($i_d$ and $i_q$).

3. The apparatus as set forth in claim 2, wherein the position estimation error detector further includes a current calculator for calculating a value C using a predetermined equation including the stationary coordinate system current values ($i_\alpha$ and $i_\beta$) and the synchronous coordinate system current values ($i_d$ and $i_q$), and generating the calculated value C.

4. The apparatus as set forth in claim 3, wherein the position estimation error detector further includes a position estimation error determination unit for comparing the calculated value C with a reference value A, and determining the presence or absence of the position estimation error of the motor according to the result of the comparison.

5. The apparatus as set forth in claim 4, wherein the current calculator receives the stationary coordinate system current values from the three-phase/stationary coordinate system converter, and receives the synchronous coordinate system current values from the stationary/synchronous coordinate system converter.

6. The apparatus as set forth in claim 2, wherein the current calculator satisfies a predetermined equation denoted by $C=\sqrt{i_\alpha^2+i_\beta^2}-\sqrt{i_d^2+i_q^2}$ when generating the calculated value C.

7. The apparatus as set forth in claim 4, wherein the position estimation error determination unit compares the calculated value C received from the current calculator with the reference value A, and determines whether a difference between the calculated value C and the reference value A is equal to or higher than a predetermined value $\alpha$.

8. The apparatus as set forth in claim 4, wherein the position estimation error determination unit outputs the error signal to the controller when the difference between the calculated value C and the reference value A is equal to or higher than the predetermined value $\alpha$.

9. The apparatus as set forth in claim 8, wherein the controller receives the error signal from the position estimation error determination unit, prevents a Pulse Width Modulation (PWM) signal from being transmitted to the inverter, and stops operations of the motor.

10. A method for protecting and controlling a sensorless motor drive apparatus, comprising:

detecting three-phase current values applied to a motor, and converting the detected three-phase current values into stationary coordinate system current values $i_\alpha$ and $i_\beta$;

converting the stationary coordinate system current values $i_\alpha$ and $i_\beta$ using data ($\sin\theta$ and $\cos\theta$) associated with a position estimation angle of the motor into synchronous coordinate system current values $i_d$ and $i_q$;

calculating a value C according to a predetermined equation including the stationary coordinate system current values $i_\alpha$ and $i_\beta$ the synchronous coordinate system current values $i_d$ and $i_q$, and generating the calculated value C; and comparing the calculated value C with a predetermined reference value A, and generating an error signal if it is determined that a difference between the calculated value C and the reference value A is equal to or higher than a predetermined value $\alpha$.

11. The method as set forth in claim 10, wherein the calculating satisfies a predetermined equation denoted by $C=\sqrt{i_\alpha^2+i_\beta^2}-\sqrt{i_d^2+i_q^2}$ when generating the calculated value C.

12. The method as set forth in claim 10, wherein the comparing and generating outputs the error signal to a controller controlling operations of the motor when the difference between the calculated value C and the reference value A is equal to or higher than the predetermined value $\alpha$.

13. The method as set forth in claim 10, wherein the comparing and generating controls a controller having received the error signal to prevent a Pulse Width Modulation (PWM) signal from being generated, and stops operations of the motor.

14. A sensorless motor drive apparatus, comprising:

a rectifier for rectifying an AC (Alternating Current) voltage generated from an AC power source to a DC (Direct Current) voltage;

an inverter for receiving the DC voltage from the rectifier, and converting the received DC voltage into a three-phase AC voltage;

a current detector for detecting a value of a current transmitted from the inverter to a motor;

a controller for estimating a rotation speed and a rotor position of the motor using voltage and current signals applied to the motor, and transmitting a control signal to the inverter to control the motor; and a position estimation error detector for determining the presence or absence of a position estimation error of the motor using the current value detected by the current detector and a rotor position estimation angle estimated by the controller, wherein the position estimation error detector includes:

a three-phase/stationary coordinate system converter for converting three-phase current values (Iu, Iv, and Iw) detected by the current detector into stationary coordinate system current values ($i_\alpha$ and $i_\beta$), a stationary/synchronous coordinate system converter for converting the stationary coordinate system current values ($i_\alpha$ and $i_\beta$) using data ($\cos\theta$ and $\sin\theta$) associated with the position estimation angle into synchronous coordinate system current values ($i_d$ and $i_q$);

a current calculator for calculating a value C using a predetermined equation including the stationary coordinate system current values ($i_\alpha$ and $i_\beta$) and the synchronous coordinate system current values ($i_d$ and $i_q$), and generating the calculated value C; and a position estimation error determination unit for comparing the calculated value C with a reference value A, and determining the presence or absence of the position estimation error of the motor according to the result of the comparison, wherein the current calculator satisfies a predetermined equation denoted by $C=\sqrt{i_\alpha^2+i_\beta^2}-\sqrt{i_d^2+i_q^2}$ when generating the calculated value C.

* * * * *